US009217383B2

(12) United States Patent
Bagnasco et al.

(10) Patent No.: US 9,217,383 B2

(45) Date of Patent: Dec. 22, 2015

(54) IMBALANCE RE-SYNCHRONIZATION CONTROL SYSTEMS AND METHODS

(75) Inventors: Andrew P. Bagnasco, Plymouth, MI (US); Steven Ward Majors, Howell, MI (US); Ian J. MacEwen, White Lake, MI (US); Scott Jeffrey, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1147 days.

(21) Appl. No.: 13/223,887

(22) Filed: Sep. 1, 2011

(65) Prior Publication Data

US 2013/0060449 A1 Mar. 7, 2013

(51) Int. Cl.

| | |
|---|---|
| ***G06F 7/00*** | (2006.01) |
| ***G06F 17/00*** | (2006.01) |
| ***F02D 41/00*** | (2006.01) |
| *F02D 41/14* | (2006.01) |
| *F02D 41/28* | (2006.01) |

(52) U.S. Cl.

CPC ........ *F02D 41/0085* (2013.01); *F02D 41/1454* (2013.01); *F02D 41/1441* (2013.01); *F02D 2041/286* (2013.01)

(58) Field of Classification Search

CPC ......................... F02D 41/0085; F02D 41/1454

USPC ........... 123/672, 673; 701/103, 109; 702/199; 60/285

See application file for complete search history.

(56) References Cited

U.S. PATENT DOCUMENTS

| | | | | |
|---|---|---|---|---|
| 5,535,135 A | 7/1996 | Bush et al. | |
| 5,582,151 A * | 12/1996 | Wertheimer | 123/435 |
| 5,651,353 A * | 7/1997 | Allston | 123/673 |
| 6,314,952 B1 * | 11/2001 | Turin et al. | 123/673 |
| 6,382,198 B1 * | 5/2002 | Smith et al. | 123/673 |
| 6,510,329 B2 | 1/2003 | Heckel | |
| 7,043,899 B2 | 5/2006 | Wang et al. | |
| 7,152,594 B2 | 12/2006 | Anilovich et al. | |
| 7,248,960 B2 | 7/2007 | Ikemoto et al. | |
| 7,802,563 B2 | 9/2010 | Behr et al. | |
| 7,926,330 B2 | 4/2011 | Huang et al. | |
| 8,042,211 B2 | 10/2011 | Stansel et al. | |
| 8,261,727 B2 | 9/2012 | Bagnasco et al. | |

(Continued)

OTHER PUBLICATIONS

"Driveline Release Coordination with Negative Crankshaft Torque," Research Disclosure Database No. 562059; Feb. 2011; 2 Pages.

(Continued)

*Primary Examiner* — Mahmoud Gimie

*Assistant Examiner* — David Hamaoui

(57) ABSTRACT

Fueling to one cylinder of an engine is selectively adjusted based on a correction associated with the cylinder. An instability module increments a counter value when the correction is equal to one of a first predetermined value and a second predetermined value and was previously equal to the other one of the first and second predetermined values. The instability module selectively generates a first indicator based on the counter value. A variance of imbalance values can be determined based on samples of an exhaust gas oxygen signal. Two variances are determined: one variance with adjustment based on the correction, one without adjustment based on the correction. A variance checking module selectively generates a second indicator based on the first and second variances. A re-synchronization module re-synchronizes the imbalance values with the cylinders, respectively, in response to generation of the first indicator and/or the second indicator.

23 Claims, 11 Drawing Sheets

(56) References Cited

U.S. PATENT DOCUMENTS

| | | | | |
|---|---|---|---|---|
| 8,402,748 | B2 | 3/2013 | Funk | |
| 8,577,645 | B2 | 11/2013 | Turin et al. | |
| 2002/0148441 | A1* | 10/2002 | Tuken | 123/436 |
| 2004/0083717 | A1* | 5/2004 | Zhu et al. | 60/284 |
| 2006/0080025 | A1 | 4/2006 | Wang et al. | |
| 2007/0163542 | A1 | 7/2007 | Kettl et al. | |
| 2007/0204674 | A1 | 9/2007 | Takaku | |
| 2008/0264036 | A1 | 10/2008 | Bellovary | |
| 2009/0049824 | A1 | 2/2009 | Kojima et al. | |
| 2009/0084082 | A1 | 4/2009 | Martin et al. | |
| 2010/0011748 | A1 | 1/2010 | Yokota | |
| 2010/0077728 | A1* | 4/2010 | Wang et al. | 60/276 |
| 2010/0082297 | A1* | 4/2010 | Turin et al. | 702/183 |
| 2011/0054761 | A1* | 3/2011 | Sawada et al. | 701/103 |
| 2011/0153181 | A1* | 6/2011 | Bagnasco et al. | 701/109 |
| 2011/0192146 | A1* | 8/2011 | Sugimoto et al. | 60/276 |
| 2012/0080016 | A1* | 4/2012 | Bagnasco et al. | 123/673 |

OTHER PUBLICATIONS

U.S. Appl. No. 12/898,109, filed Oct. 5, 2010, Bagnasco et al.

Steven W. Smith, "The Scientist and Engineer's Guide to Digital Signal Processing", copyright .COPYRGT. 1997-1998,http://www.dspguide.com/ch2/2.htm.

Jeff L. Kainz et al., "Individual Cylinder Fuel Control with a Switching Oxygen Sensor", SAE Technical Paper Series, 1999-01-0546, SAE International Congress and Exposition, Detroit, Michigan, Mar. 1-4, 1999.

U.S. Appl. No. 12/326,463, filed Oct. 2, 2008, R. Turin et al.

U.S. Appl. No. 12/898,109, filed Oct. 5, 2010, A. Bagnasco et al.

* cited by examiner

IMBALANCE RE-SYNCHRONIZATION CONTROL SYSTEMS AND METHODS

FIELD

The present disclosure is related to internal combustion engines and more particularly individual cylinder fueling correction systems and methods for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel control system controls provision of fuel to an engine. The fuel control system includes an inner control loop and an outer control loop. The inner control loop may use data from an exhaust gas oxygen (EGO) sensor located upstream from a catalyst in an exhaust system. The catalyst receives exhaust gas output by the engine.

The inner control loop controls the amount of fuel provided to the engine based on the data from the upstream EGO sensor. For example only, when the upstream EGO sensor indicates that the exhaust gas is (fuel) rich, the inner control loop may decrease the amount of fuel provided to the engine. Conversely, the inner control loop may increase the amount of fuel provided to the engine when the exhaust gas is lean. Adjusting the amount of fuel provided to the engine based on the data from the upstream EGO sensor modulates the air/fuel mixture combusted within the engine at approximately a desired air/fuel mixture (e.g., a stoichiometry mixture).

The outer control loop may use data from an EGO sensor located downstream from the catalyst. For example only, the outer control loop may use the data from the upstream and downstream EGO sensors to determine an amount of oxygen stored by the catalyst and other suitable parameters. The outer control loop may also use the data from the downstream EGO sensor to correct the data provided by the upstream and/or downstream EGO sensors when the downstream EGO sensor provides unexpected data.

SUMMARY

In various features, an imbalance module determines imbalance values for cylinders of an engine based on samples of an exhaust gas oxygen signal. An offset module determines an offset value that relates one of the imbalance values with one of the cylinders. A correction module determines a fueling correction for the one of the cylinders based on the one of the imbalance values. Fueling to the one of the cylinders is selectively adjusted based on the fueling correction. An instability module increments a counter value when the fueling correction is equal to one of a first predetermined value and a second predetermined value and was previously equal to the other one of the first and second predetermined values. The instability module selectively generates an indicator based on the counter value. A re-synchronization module re-synchronizes the imbalance values with the cylinders, respectively, in response to generation of the indicator.

In other features, an imbalance module that determines imbalance values for cylinders of an engine based on samples of an exhaust gas oxygen signal. An offset module determines an offset value that relates one of the imbalance values with one of the cylinders. A correction module determines a fueling correction for the one of the cylinders based on the one of the imbalance values. Fueling to the one of the cylinders is selectively adjusted based on the fueling correction when the fueling correction. A variance determination module determines a variance of the imbalance values. A filtering module applies a filter to the variance to generate a filtered variance. A variance checking module selectively generates an indicator based on the filtered variance. A re-synchronization module re-synchronizes the imbalance values with the cylinders, respectively, in response to generation of the indicator.

In still other features, a method for a vehicle includes: determining imbalance values for cylinders of an engine based on samples of an exhaust gas oxygen signal generated using an exhaust gas oxygen (EGO) sensor; determining an offset value that relates one of the imbalance values with one of the cylinders; determining a fueling correction for the one of the cylinders based on the one of the imbalance values; selectively adjusting fueling to the one of the cylinders based on the fueling correction; re-synchronizing the imbalance values with the cylinders, respectively, in response to generation of at least one of a first indicator and a second indicator; and at least one of (i) and (ii), where (i) includes: incrementing a counter value when the fueling correction is equal to one of a first predetermined value and a second predetermined value and was previously equal to the other one of the first and second predetermined values, wherein the first and second predetermined values are different; and selectively generating the first indicator based on the counter value; and (ii) includes: determining a variance of the imbalance values; applying a filter to the variance to generate a filtered variance; and selectively generating the second indicator based on the filtered variance.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
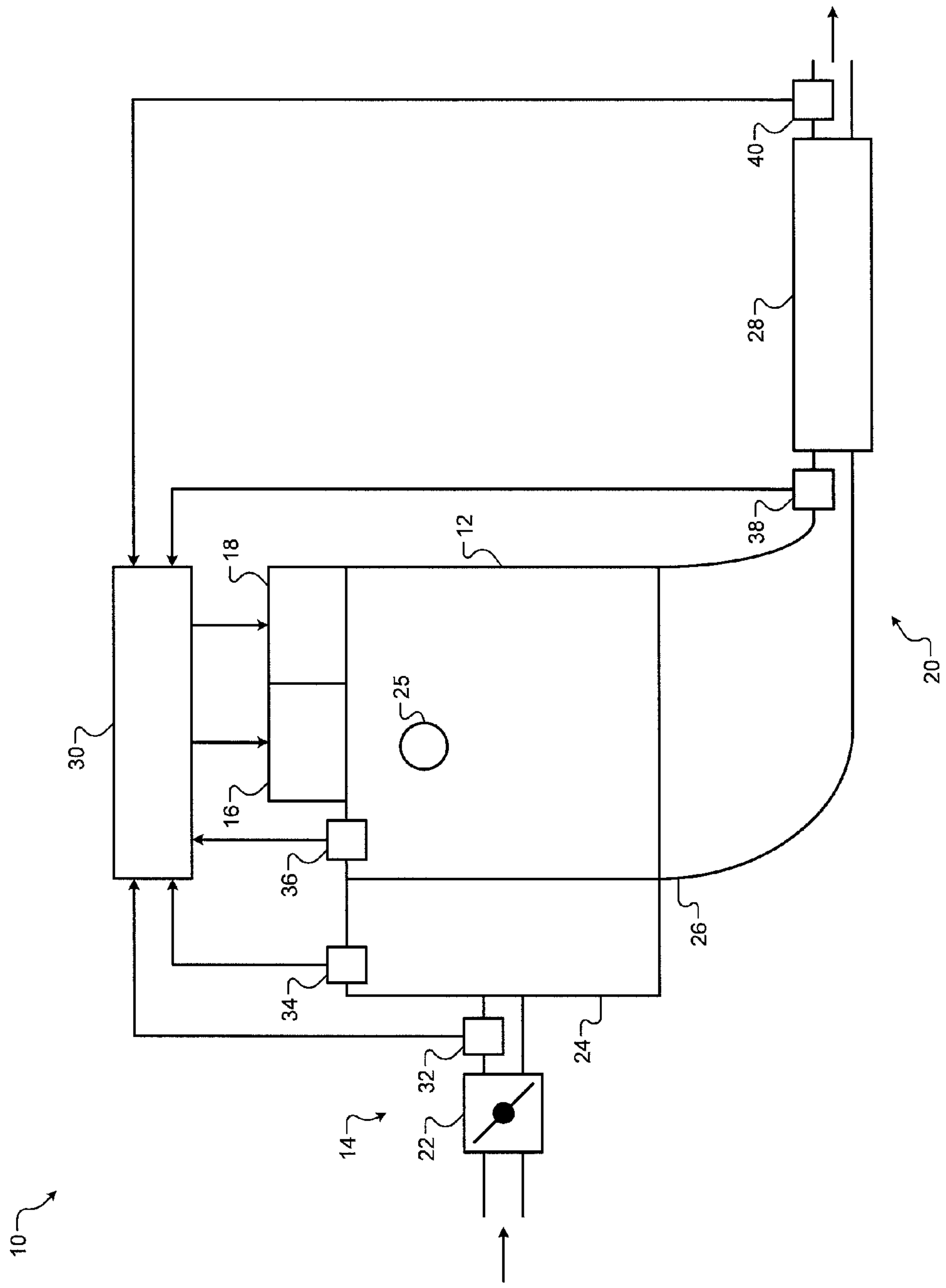
FIG. 1 is a functional block diagram of an example engine system according to the present disclosure.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine produces exhaust gas and expels the exhaust gas to an exhaust system. The exhaust gas travels through the exhaust system to a catalyst. An exhaust gas oxygen (EGO) sensor measures oxygen in the exhaust gas upstream of the catalyst and generates an output based on the measured oxygen.

An engine control module (ECM) controls an amount of fuel provided to the engine. The ECM monitors the output of the oxygen sensor and determines imbalance values for cylinders of the engine based on samples of the output of the oxygen sensor. The ECM determines an offset value that associates one of the imbalance values to one of the cylinders of the engine. Based on the offset value and a firing order of the cylinders, the other imbalance values can be correlated to the other cylinders of the engine. The ECM determines fueling (imbalance) corrections for the cylinders based on the imbalance values, respectively. The ECM adjusts fueling of the cylinders based on the fueling corrections, respectively.

Under some circumstances, the association between the imbalance values and the cylinders may be or become incorrect (mis-synchronized). Continuing to adjust fueling of the cylinders based on the fueling corrections, respectively, when the association is incorrect may cause one or more of the cylinders to become more imbalanced. Accordingly, the ECM selectively disables use of the fueling corrections and trigger performance of a re-synchronization event when the association is incorrect. A re-synchronization event may include determining a new set of imbalance values for the cylinders, determining a new offset value, and correlating the new imbalance values with the cylinders, respectively.

The ECM of the present disclosure selectively triggers a re-synchronization event when one or more of the fueling corrections have previously been limited to a predetermined maximum value and to a predetermined minimum value (at different times). A fueling correction may periodically transition between the predetermined minimum value and the predetermined maximum value and vice versa when the association between the imbalance values and the cylinders is incorrect.

The ECM of the present disclosure selectively triggers a re-synchronization event based on a synchronization metric. The synchronization metric is determined based on a first value of a variance of the imbalance values taken over a first period when the fueling corrections are used relative to a second value of the variance of the imbalance values taken over a second period when the fueling corrections are not used. The fact that the second value of the variance is not greater than the first value of the variance may indicate that the association between the imbalance values and the cylinders is incorrect.

Referring now to FIG. 1, a functional block diagram of an example engine system 10 is presented. The engine system 10 includes an engine 12, an intake system 14, a fuel system 16, an ignition system 18, and an exhaust system 20. While the engine system 10 is shown and will be described in terms of a gasoline engine, the present application is applicable to diesel engine systems, hybrid engine systems, and other suitable types of engine systems.

The intake system 14 may include a throttle 22 and an intake manifold 24. The throttle 22 controls air flow into the intake manifold 24. Air flows from the intake manifold 24 into one or more cylinders within the engine 12, such as cylinder 25. While only the cylinder 25 is shown, the engine 12 may include more than one cylinder.

The fuel system 16 controls the provision of fuel to the engine 12. The ignition system 18 selectively ignites an air/fuel mixture within the cylinders of the engine 12. The air of the air/fuel mixture is provided via the intake system 14, and the fuel of the air/fuel mixture is provided by the fuel system 16.

Exhaust resulting from combustion of the air/fuel mixture is expelled from the engine 12 to the exhaust system 20. The exhaust system 20 includes an exhaust manifold 26 and a catalyst 28. For example only, the catalyst 28 may include a three way catalyst (TWC) and/or another suitable type of catalyst. The catalyst 28 receives the exhaust output by the engine 12 and reduces the amounts of various components of the exhaust.

The engine system 10 also includes an engine control module (ECM) 30 that regulates operation of the engine system 10. The ECM 30 communicates with the intake system 14, the fuel system 16, and the ignition system 18. The ECM 30 also communicates with various sensors. For example only, the ECM 30 may communicate with a mass air flow (MAF) sensor 32, a manifold air pressure (MAP) sensor 34, a crankshaft position sensor 36, and other suitable sensors.

The MAF sensor 32 measures a mass flowrate of air flowing into the intake manifold 24 and generates a MAF signal based on the mass flowrate. The MAP sensor 34 measures pressure within the intake manifold 24 and generates a MAP signal based on the pressure. In some implementations, engine vacuum may be measured with respect to ambient pressure. The crankshaft position sensor 36 monitors rotation of a crankshaft (not shown) of the engine 12 and generates a crankshaft position signal based on the rotation of the crankshaft. The crankshaft position signal may be used to determine an engine speed (e.g., in revolutions per minute). The crankshaft position signal may also be used for cylinder identification and one or more other suitable purposes.

The ECM 30 also communicates with exhaust gas oxygen (EGO) sensors associated with the exhaust system 20. For example only, the ECM 30 communicates with an upstream EGO sensor (US EGO sensor) 38 and a downstream EGO sensor (DS EGO sensor) 40. The US EGO sensor 38 is located upstream of the catalyst 28, and the DS EGO sensor 40 is located downstream of the catalyst 28. The US EGO sensor 38 may be located, for example, at a confluence point of exhaust runners (not shown) of the exhaust manifold 26 or at another suitable location.

The US and DS EGO sensors 38 and 40 measure an amount of oxygen in the exhaust at their respective locations and generate an EGO signal based on the amounts of oxygen. For example only, the US EGO sensor 38 generates an upstream EGO (US EGO) signal based on the amount of oxygen upstream of the catalyst 28. The DS EGO sensor 40 generates a downstream EGO (DS EGO) signal based on the amount of oxygen downstream of the catalyst 28.

The US and DS EGO sensors 38 and 40 may each include a switching EGO sensor, a universal EGO (UEGO) sensor (also referred to as a wide band or wide range EGO sensor), or another suitable type of EGO sensor. A switching EGO sensor generates an EGO signal in units of voltage, and switches the EGO signal between a low voltage (e.g., approximately 0.2 V) and a high voltage (e.g., approximately 0.8 V) when the oxygen concentration is lean and rich, respectively. A UEGO sensor generates an EGO signal that corresponds to an equivalence ratio (EQR) of the exhaust gas and provides measurements between rich and lean.

Figure 2:
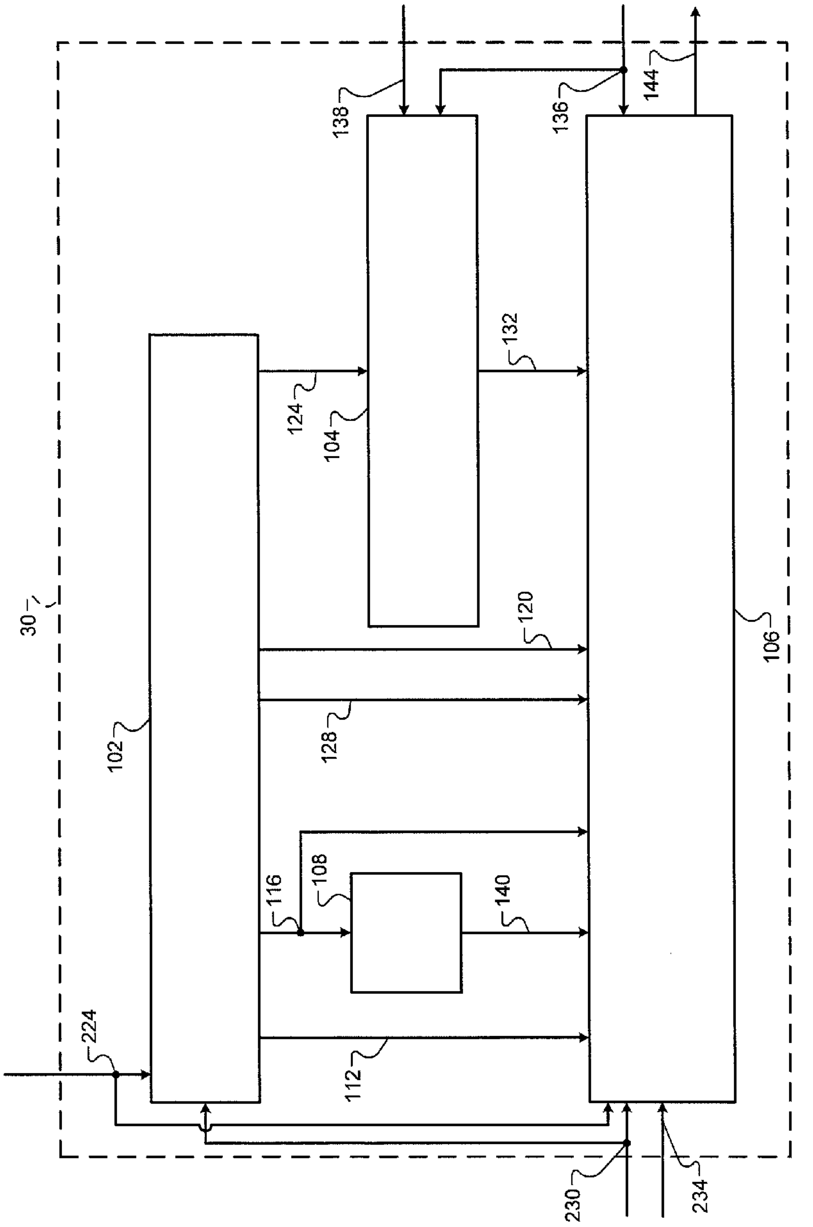
FIG. 2 is a functional block diagram of an example engine control module according to the present disclosure.

Referring now to FIG. 2, a functional block diagram of an example implementation of the ECM 30 is presented. The ECM 30 may include a command generator module 102, an outer loop module 104, an inner loop module 106, and a reference generation module 108.

The command generator module 102 may determine one or more engine operating conditions. For example only, the engine operating conditions may include, but are not limited to, engine speed 112, air per cylinder (APC), engine load 116, and/or other suitable parameters. The APC may be predicted for one or more future combustion events in some engine systems. The engine load 116 may be determined based on, for example, a ratio of the APC to a maximum APC of the engine 12. The engine load 116 may alternatively be determined based on an indicated mean effective pressure (IMEP), engine torque, or another suitable parameter indicative of engine load.

The command generator module 102 generates a base equivalence ratio (EQR) request 120. The base EQR request 120 may be generated based on an APC and to achieve a desired equivalence ratio (EQR) of the air/fuel mixture. For example only, the desired EQR may include a stoichiometric EQR (i.e., 1.0). The command generator module 102 also determines a desired downstream exhaust gas output (a desired DS EGO) 124. The command generator module 102 may determine the desired DS EGO 124 based on, for example, one or more of the engine operating conditions.

The command generator module 102 may also generate one or more open-loop fueling corrections 128 for the base EQR request 120. The open-loop fueling corrections 128 may include, for example, a sensor correction and an error correction. For example only, the sensor correction may correspond to a correction to the base EQR request 120 to accommodate the measurements of the US EGO sensor 38. The error correction may correspond to a correction in the base EQR request 120 to account for errors that may occur, such as errors in the determination of the APC and errors attributable to provision of fuel vapor to the engine 12 (i.e., fuel vapor purging).

The outer loop module 104 may also generate one or more open-loop fueling corrections 132 for the base EQR request 120. The outer loop module 104 may generate, for example, an oxygen storage correction and an oxygen storage maintenance correction. For example only, the oxygen storage correction may correspond to a correction in the base EQR request 120 to adjust the oxygen storage of the catalyst 28 to a desired oxygen storage within a predetermined period. The oxygen storage maintenance correction may correspond to a correction in the base EQR request 120 to modulate the oxygen storage of the catalyst 28 at approximately the desired oxygen storage.

The outer loop module 104 may estimate the oxygen storage of the catalyst 28 based on the US EGO signal 136 and the DS EGO signal 138. The outer loop module 104 may generate the open-loop fueling corrections 132 to adjust the oxygen storage of the catalyst 28 to the desired oxygen storage and/or to maintain the oxygen storage at approximately the desired oxygen storage. The outer loop module 104 may also generate the open-loop fueling corrections 132 to minimize a difference between the DS EGO signal 138 and the desired DS EGO 124.

The inner loop module 106 (see FIG. 3) determines an upstream EGO correction (US EGO correction) based on a difference between the US EGO signal 136 and an expected US EGO. The US EGO correction may correspond to, for example, a correction in the base EQR request 120 to minimize the difference between the US EGO signal 136 and the expected US EGO. The inner loop module 106 also determines imbalance (fueling) correction (see FIGS. 3 and 4) for the cylinder 25. The inner loop module 106 determines an imbalance correction for each of the cylinders. The imbalance corrections may also be referred to as individual cylinder fuel correction (ICFCs) or fueling corrections. The imbalance correction for a cylinder may correspond to, for example, a correction in the base EQR request 120 to balance an output of the cylinder with output of the other cylinders.

The reference generation module 108 generates a reference signal 140. For example only, the reference signal 140 may include a sinusoidal wave, triangular wave, or another suitable type of periodic signal. The reference generation module 108 may selectively vary the amplitude and frequency of the reference signal 140. For example only, the reference generation module 108 may increase the frequency and amplitude as the engine load 116 increases and vice versa. The reference signal 140 may be provided to the inner loop module 106 and one or more other modules.

The reference signal 140 may be used in determining a final EQR request 144 to transition the EQR of the exhaust gas provided to the catalyst 28 between a predetermined rich EQR and a predetermined lean EQR and vice versa. For example only, the predetermined rich EQR may be approximately 3 percent rich (e.g., an EQR of 1.03), and the predetermined lean EQR may be approximately 3 percent lean (e.g., an EQR of approximately 0.97). Transitioning the EQR may improve the efficiency of the catalyst 28. Additionally, transitioning the EQR from the predetermined rich EQR to the predetermined lean EQR and vice versa may be useful in diagnosing faults in the US EGO sensor 38, the catalyst 28, and/or the DS EGO sensor 40.

The inner loop module 106 determines the final EQR request 144 based on the base EQR request 120 and the US EGO correction. The inner loop module 106 determines the final EQR request 144 further based on the sensor correction, the error correction, the oxygen storage correction, and the oxygen storage maintenance correction, and the reference signal 140. For example only, the inner loop module 106 may determine the final EQR request 144 based on a sum of the base fuel request 120, the US EGO correction, the sensor correction, the error correction, the oxygen storage correction, and the oxygen storage maintenance correction, and the reference signal 140. The inner loop module 106 may determine the final EQR request 144 for the cylinder 25 based on a product of the sum and the imbalance correction for the cylinder 25. The ECM 30 controls the fuel system 16 based on the final EQR request 144. For example only, the ECM 30 may control the fuel system 16 using pulse width modulation (PWM).

Figure 3:
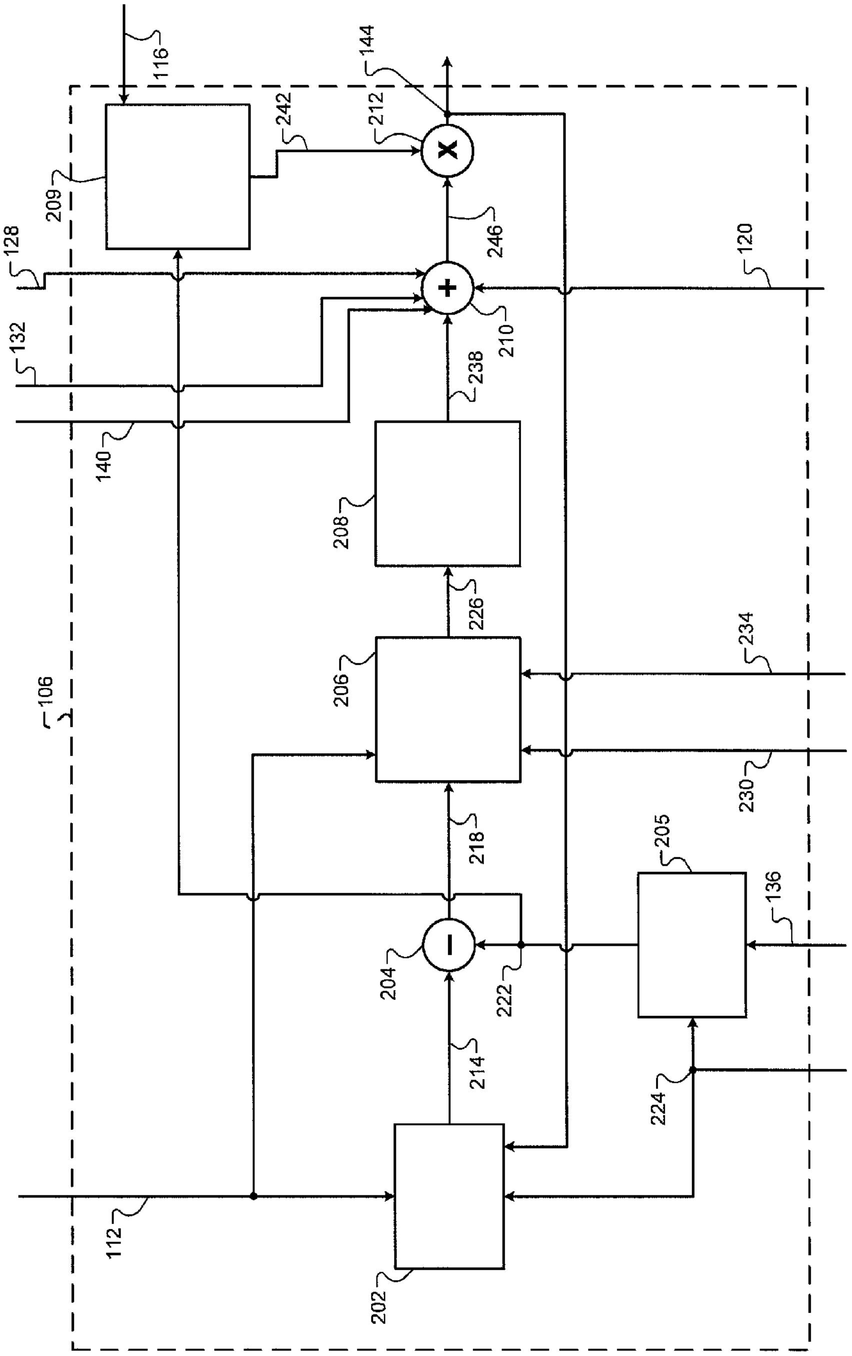
FIG. 3 is a functional block diagram of an example inner loop module according to the present disclosure.

Referring now to FIG. 3, a functional block diagram of an example implementation of the inner loop module 106 is presented. The inner loop module 106 may include an expected US EGO module 202, an error module 204, a sampling module 205, a scaling module 206, and a compensator module 208. The inner loop module 106 may also include an imbalance correction module 209, an initial EQR module 210, and a final EQR module 212.

The expected US EGO module 202 determines the expected US EGO 214. The expected US EGO module 202 determines the expected US EGO 214 based on the final EQR request 144. The expected US EGO 214 corresponds to an expected value of a given sample of the US EGO signal 136. However, delays of the engine system 10 prevent the exhaust gas resulting from combustion from being immediately reflected in the US EGO signal 136. The delays of the engine system 10 may include, for example, an engine delay, a transport delay, and a sensor delay.

The engine delay may correspond to a period between, for example, when fuel is provided to a cylinder of the engine 12 and when the resulting exhaust is expelled from the cylinder. The transport delay may correspond to a period between when the resulting exhaust is expelled from the cylinder and when the resulting exhaust reaches the location of the US EGO sensor 38. The sensor delay may correspond to the delay between when the resulting exhaust reaches the location of the US EGO sensor 38 and when the resulting exhaust is reflected in the US EGO signal 136.

The US EGO signal 136 may also reflect a mixture of the exhaust produced by different cylinders of the engine 12. The expected US EGO module 202 accounts for exhaust mixing and the engine, transport, and sensor delays in determining the expected US EGO 214. The expected US EGO module 202 stores the EQR of the final EQR request 144. The expected US EGO module 202 determines the expected US EGO 212 based on one or more stored EQRs, exhaust mixing, and the engine, transport, and sensor delays.

The error module 204 determines an upstream EGO error (US EGO error) 218 based on a sample of the US EGO signal (i.e., a US EGO sample) 222 taken at a given sampling time and the expected US EGO 214 for the given sampling time. More specifically, the error module 204 determines the US EGO error 218 based on a difference between the US EGO sample 222 and the expected US EGO 214.

The sampling module 205 selectively samples the US EGO signal 136 and provides the samples to the error module 204. The sampling module 205 may sample the US EGO signal 136 at a predetermined rate, such as once per predetermined number of crankshaft angle degrees (CAD) as indicated by a crankshaft position 224 measured using the crankshaft position sensor 36. The predetermined rate may be set based on the number of cylinders of the engine 12, the number of EGO sensors implemented, the firing order of the cylinders, and a configuration of the engine 12. For example only, for a four cylinder engine with one cylinder bank and one EGO sensor, the predetermined rate may be approximately eight CAD based samples per engine cycle or another suitable rate.

The scaling module 206 determines a fuel error 226 based on the US EGO error 218. The scaling module 206 may apply one or more gains or other suitable control factors in determining the fuel error 226 based on the US EGO error 218. For example only, the scaling module 206 may determine the fuel error 226 using the equation:

$$\text{Fuel Error} = \frac{MAF}{14.7} * US\ EGO\ \text{Error}, \tag{1}$$

where Fuel Error is the fuel error 226, MAF is a MAF 230 measured using the MAF sensor 32, and US EGO Error is the US EGO error 218.

In another implementation, the scaling module 206 may determine the fuel error 226 using the equation:

$$\text{Fuel Error}=k(\text{MAP,RPM})*\text{US EGO Error}, \tag{2}$$

where RPM is the engine speed 112, MAP is a MAP 234 measured using the MAP sensor 34, and k is based on a function of the MAP 234 and the engine speed 112. In some implementations, k may be based on a function of the engine load 116.

The compensator module 208 determines the US EGO correction 238 based on the fuel error 226. For example only, the compensator module 208 may employ a proportional-integral (PI) control scheme, a proportional (P) control scheme, a proportional-integral-derivative (PID) control scheme, or another suitable control scheme to determine the US EGO correction 238 based on the fuel error 226.

The imbalance correction module 209 (see FIG. 4) monitors the US EGO samples 222 of the US EGO signal 136. The imbalance correction module 209 determines imbalance values for the cylinders of the engine 12 based on the US EGO sample 222 and an average of a predetermined number of previous US EGO samples 222. The imbalance correction module 209 determines an offset value that relates (associates) one of the imbalance values to (with) one of the cylinders of the engine 12. The imbalance correction module 209 correlates the other cylinders of the engine with the other imbalance values, respectively, based on the firing order of the cylinders. The imbalance correction module 209 determines imbalance (fueling) corrections for the cylinders of the engine 12 based on the imbalance values associated with the cylinders, respectively. For example, the imbalance correction module 209 may determine an imbalance correction 242 for the cylinder 25 based on the imbalance value associated with the cylinder 25.

The initial EQR module 210 determines an initial EQR request 246 based on the base EQR request 120, the reference signal 140, the US EGO correction 238, and the open-loop fueling correction(s) 128 and 132. For example only, the initial EQR module 210 may determine the initial EQR request 246 based on the sum of the base EQR request 120, the reference signal 140, the US EGO correction 238, and the open-loop fueling correction(s) 128 and 132.

The final EQR module 212 determines the final EQR request 144 based on the initial EQR request 246 and the imbalance correction 242. More specifically, the final EQR module 212 corrects the initial EQR request 246 based on the imbalance correction 242 that is associated with the next cylinder in the firing order. The final EQR module 212 may, for example, set the final EQR request 144 equal to a product of the initial EQR request 246 and the imbalance correction 242 or to a sum of the initial EQR request 246 and the imbalance correction 242. The fuel system 16 controls the provision of fuel to the next cylinder in the firing order based on the final EQR request 144.

Figure 4:
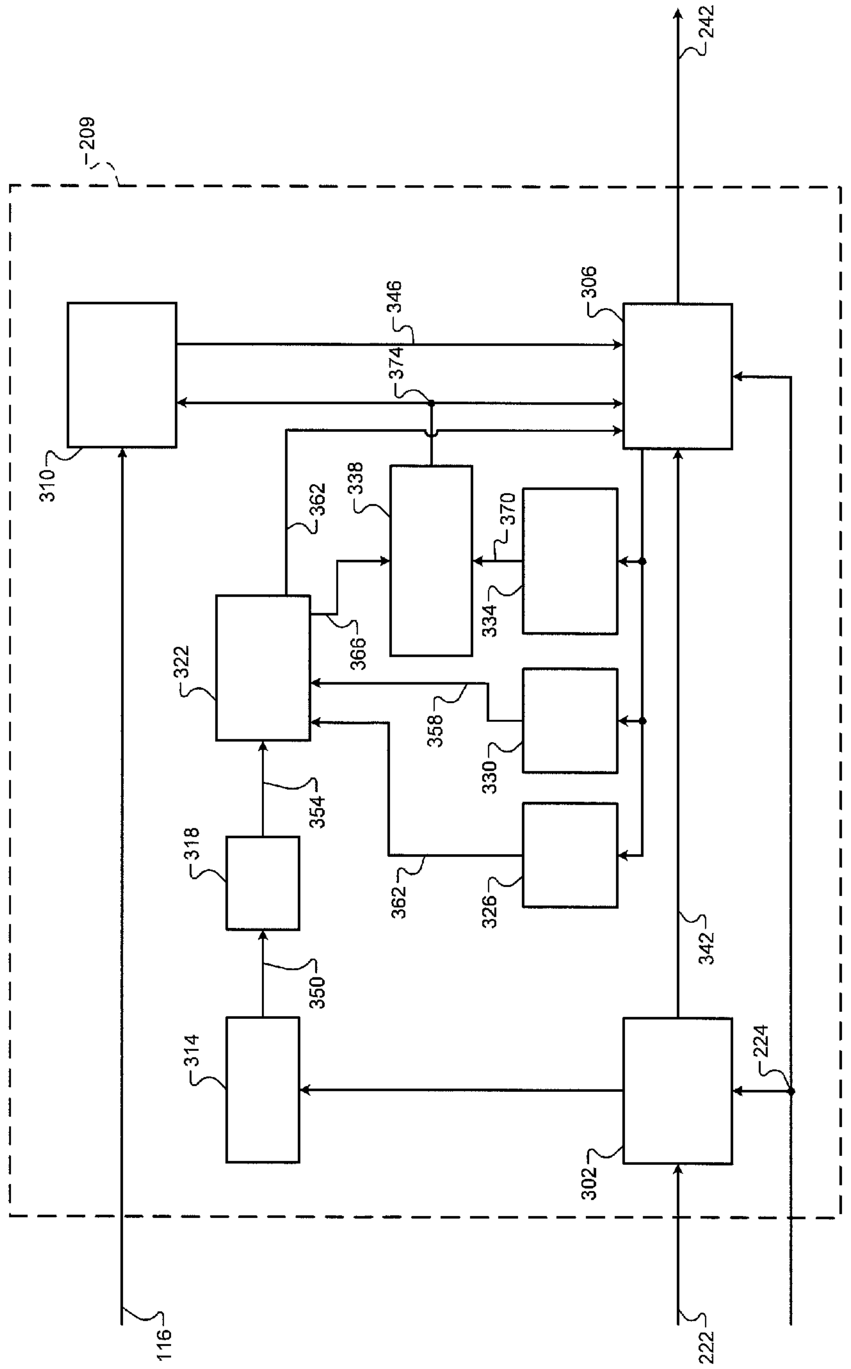
FIG. 4 is a functional block diagram of an exemplary imbalance correction module according to the present disclosure.

Referring now to FIG. 4, a functional block diagram of an example implementation of the imbalance correction module 209 is presented. The imbalance correction module 209 may include an imbalance module 302, a correction module 306, an offset module 310, a variance determination module 314, and a filtering module 318. The imbalance correction module 209 may also include a variance checking module 322, a steady-state (SS) indication module 326, a limited indication module 330, an instability module 334, and a re-synchronization triggering module 338.

The imbalance module 302 monitors the US EGO samples 222 and may store the US EGO samples 222. The imbalance module 302 determines an average (not shown) of a predetermined number of the US EGO samples 222. For example only, the predetermined number of EGO samples 222 may be one engine cycle worth of the most recent US EGO samples 222. One engine cycle may refer to two complete revolutions of a crankshaft of the engine 12 (i.e., 720° of crankshaft rotation). In engines operating based on two strokes, one engine cycle may refer to one revolution of the crankshaft, etc. The average may include a weighted average or another suitable type of average. The imbalance module 302 may update the average each time that a new US EGO sample 222 is received based on the predetermined number of the US EGO samples 222 including the new US EGO sample 222.

The imbalance module 302 determines an imbalance value 342 each time that a US EGO sample 222 is received. The imbalance module 302 determines the imbalance value 342 based on a difference between the average and the US EGO sample 222. An imbalance value 342 of zero indicates that an output of the cylinder associated with the imbalance value 342 is balanced relative to an average output of the cylinders.

The imbalance module 302 stores at least a predetermined number of the imbalance values 342. In this manner, at least a predetermined number (N) of the most recently determined imbalance values 342 may be stored in the imbalance module 302, where N is an integer. N may be may be set to, for example, at least a predetermined minimum number of imbalance values 342 that is based on the number of US EGO samples 222 taken per engine cycle. For example only, the predetermined minimum number may be equal to two times the rate of combustion events monitored by the US EGO sensor 38 per engine cycle.

An offset value 346 relates one of the stored imbalance values 342 to one of the cylinders of the engine 12. Once the offset value 346 is known and the one of the stored imbalance values 342 is associated with the one of the cylinders of the engine 12, other ones of the stored imbalance values 342 can be correlated with other ones of the cylinders of the engine 12 using the firing order and the order in which the imbalance values 342 were stored.

The correction module 306 determines imbalance corrections 242 for the cylinders of the engine 12, respectively. The correction module 306 may determine the imbalance correction 242 for a given cylinder to adjust the imbalance value 342 for the given cylinder toward zero and to bring the output of the given cylinder into balance with the average. For example only, the correction module 306 may determine the imbalance correction 242 using an integral (I) control scheme or another suitable type of control scheme.

The correction module 306 may limit the imbalance corrections 242 to a predetermined maximum value and a predetermined minimum value that establish a predetermined range centered around a predetermined no correction value. Where the final EQR request 144 is determined based on a product of the initial EQR request 246 and the imbalance correction 242, the predetermined no correction value may be 1.0 such that the final EQR request 144 would be set equal to the initial EQR request 246.

The predetermined maximum value is equal to the predetermined no correction value plus a predetermined limit value. The predetermined minimum value is equal to the predetermined no correction value minus the predetermined limit value. The predetermined limit value may be set, for example, to between approximately 12 percent and approximately 20 percent, inclusive, or to another suitable value. If the predetermined limit value is 12 percent and the predetermined no correction value is 1.0, for example, the predetermined maximum value is 1.12 and the predetermined minimum value is 0.88. The correction module 306 selectively provides the imbalance corrections 242 to the final EQR module 212 as needed for the next cylinder in the firing order. The correction module 306 associates the imbalance corrections 242 with the cylinders, respectively, based on the offset value 346.

Initially, such as upon engine startup or when a re-synchronization event is triggered, the offset module 310 may be determine the offset value 346 by table look up, trial and error, or probing. For example only, the offset module 310 may look up the offset value 346 based on the engine load 116. Thereafter, the offset module 310 may selectively update the offset value 346 based on the engine load 116. As stated above, the engine load 116 may be determined based on APC. In various implementations, the engine load 116 may instead be based on engine torque, indicated mean effective pressure (IMEP), or another suitable parameter indicative of the engine load 116.

The offset module 310 may determine the offset value 346 further based on a response time (not shown) of the US EGO sensor 38. For example only, the offset module 310 may determine the offset value 346 from one or more mappings that relate the engine load 116 and the response time to the offset value 346, using one or more functions that relates the engine load 116 and the response time to the offset value 346, or in another suitable manner. If the offset value 346 is not an integer, the offset module 310 may round the offset value 346 to a nearest integer.

The response time of the US EGO sensor 38 may be set to or based on a rich to lean (R2L) response time. The R2L response time may be determined based on an average of a predetermined number of previous response times of the US EGO sensor 38. A given one of the previous response times may refer to a period of time between a first time when the final EQR request 144 is transitioned from a rich EQR to a lean EQR and a second time when one or more of the US EGO samples 222 reflect the transition.

The response time of the US EGO sensor 38 may additionally or alternatively be determined based on an a lean to rich (L2R) response time. The L2R response time may be determined based on an average of a predetermined number of previous response times of the US EGO sensor 38. A given one of the previous response times may refer to a period of time between a third time when final EQR request is transitioned from a lean EQR to a rich EQR and a fourth time when one or more of the US EGO samples 222 reflects the transition.

In various implementations, the response time of the US EGO sensor 38 may set to an average response time. For example only, the average response time may be determined using the equation:

$$\text{Average Response Time} = \frac{R2L\ RT + L2R\ RT}{2},$$

where R2L RT is the R2L response time and L2R RT is the L2R response time.

Determining the offset value 346 based on the response time of the US EGO sensor 38 ensures that the offset value 346 accounts for slowing the US EGO sensor 38 (i.e., increasing of the sensor delay). Determining the offset value 346 based on the response time may decrease the possibility of increasing the imbalance of one or more cylinders that may occur when the imbalance values 342 are incorrectly associated (or synchronized) with the cylinders, respectively.

The variance determination module 314 determines a variance 350 based on the stored imbalance values 342. For example only, the variance determination module 314 may determine a standard deviation of the stored imbalance values 342 and determine the variance 350 as a square of the standard deviation. The filtering module 318 applies a filter to the variance 350 to generate a filtered variance 354. For example only, the filter may include a first-order lag filter or another suitable type of filter.

When the imbalance corrections 242 are being used, the imbalance corrections 242 are in steady-state (SS), and one or more of the imbalance corrections 242 are in a limited state, the variance checking module 322 selectively performs a variance check. Performance of the variance check is discussed in detail below. The limited indication module 330 indicates whether one or more of the imbalance corrections 242 are in the limited state. For example only, the limited indication module 330 may set a limited indicator 358 to an active state when one or more of the imbalance corrections 242 are in the limited state. The limited indication module 330 may set the limited indicator 358 to an inactive state when none of the imbalance corrections 242 are in the limited state.

A given one of the imbalance corrections 242 may be deemed to be in the limited state when the one of the imbalance corrections 242 is equal to the predetermined maximum value or the predetermined minimum value. For example only, if the predetermined limit value is 12 percent and the predetermined no correction value is 1.0, for example, the one of the imbalance corrections 242 may be deemed to be in the limited state when the one of the imbalance corrections 242 is equal to 0.88 or 1.12.

The SS indication module 326 indicates whether the imbalance corrections 242 are in SS. For example, the SS indication module 326 may set a SS indicator 362 to an active state when the one or more of the imbalance corrections 242 are in SS. The SS indication module 326 may set the SS indicator 362 to an inactive state when the one or more of the imbalance corrections 242 are not in SS.

A given one of the imbalance corrections 242 may be deemed to be in SS when a change in the one of the imbalance corrections 242 over a predetermined period is less than a predetermined amount. For example only, the predetermined period may be approximately 100 engine cycles or another suitable period, and the predetermined amount may be approximately 2 percent or another suitable amount.

When one or more of the imbalance corrections 242 have been in the limited state and the imbalance corrections 242 have been in SS and for a first predetermined period, the variance checking module 322 may set a first variance value equal to the filtered variance 354. The filtered variance 354 at this time is determined with the imbalance corrections 242 being used. For example only, the first predetermined period may be approximately 100 engine cycles or another suitable period.

When one or more of the imbalance corrections 242 have been in the limited state and the imbalance corrections 242 have been in SS for the first predetermined period, the variance checking module 322 also generates a command 362 to disable use of the imbalance corrections 242. The correction module 306 sets each of the imbalance corrections 242 to the predetermined no correction value to disable use of the imbalance corrections 242.

The variance checking module 322 may generate the command 362 for a second predetermined period. The second predetermined period may be equal to the first predetermined period and may be set to, for example, 100 engine cycles or another suitable period. When one or more of the imbalance corrections 242 have been in the limited state and the imbalance corrections 242 have been in SS for the second predetermined period (after the first predetermined period), the variance checking module 322 may set a second variance value equal to the filtered variance 354. The filtered variance 354 at this time is determined without the imbalance corrections 242 being used. In various implementations, the variance checking module 322 may not require that one or more of the imbalance corrections 242 be in the limited state and the imbalance corrections 242 be in SS for the second predetermined period. Instead, the variance checking module 322 may set the second variance value equal to the filtered variance 354 when the second predetermined period passes after use of the imbalance corrections 242 is disabled.

The variance checking module 322 may determine a synchronization metric based on the first and second variance values. For example only, the variance checking module 322 may set the synchronization metric equal to the second variance value divided by the first variance value. In other words, the synchronization metric may be set to the second value of the filtered variance 354 that reflects the non-use of the imbalance corrections 242 divided by the first value of the filtered variance 354 that reflects the use of the imbalance corrections 242. The variance checking module 322 may stop generating the command 362 after the second predetermined period.

The variance checking module 322 indicates whether the variance check passed or failed based on a comparison of the synchronization metric and a first predetermined value. For example only, the variance checking module 322 may indicate that the variance check passed when the synchronization metric is greater than the first predetermined value. The variance checking module 322 may indicate that the variance check failed when the synchronization metric is less than the first predetermined value. For example only, the first predetermined value may be between approximately 1.0 and approximately 1.2, inclusive, or another suitable value. Being approximately equal to 1.0 (one) may refer to a value that, when rounded down to a nearest integer, is rounded down to 1.0.

The variance check may therefore be passed when the filtered variance 354 determined over the second predetermined period is significantly greater than the filtered variance 354 determined over the first predetermined period. The variance check may be failed when the opposite is true.

The variance checking module 322 generates a variance check indicator 366 that indicates whether the variance check passed or failed. For example only, the variance checking module 322 may set the variance check indicator 366 to an active state when the variance check failed. The variance checking module 322 may set the variance check indicator 366 to an inactive state when the variance check passed.

The instability module 334 performs an instability check based on the imbalance corrections 242 that are associated with the cylinders, respectively. The instability module 334 may set a maximum limit indicator associated with a given cylinder to an active state when the one of the imbalance corrections 242 that is associated with the cylinder (based on the offset value 346) is equal to the predetermined maximum value. The instability module 334 may set a minimum limit indicator for a given cylinder to an active state when the one of the imbalance corrections 242 that is associated with the cylinder is equal to the predetermined minimum value. Similarly or identically, the instability module 334 may set maximum and minimum limit indicators associated with the other cylinders of the engine 12, respectively.

The instability module 334 may increment a counter value when the maximum and minimum limit indicators associated with a given cylinder are both in the active state. After incrementing the counter value, the instability module 334 may set the maximum and minimum indicators for all of the cylinders to an inactive state.

The instability module 334 may indicate whether the instability check passed or failed based on a comparison of the counter value and a second predetermined value. For example only, the instability module 334 may indicate that the instability check failed when the counter value is greater than the second predetermined value. The instability module 334 may indicate that the instability check passed when the counter value is less than the second predetermined value. The second predetermined value is an integer greater than zero and may be set to, for example, 1, 2, 3, 4, or another suitable number. The second predetermined value may be set based on the magnitude of the predetermined limit value. For example only, the second predetermined value may increase as the predetermined limit value decreases and vice versa.

The instability module 334 generates an instability check indicator 370 that indicates whether the instability check passed or failed. For example only, the instability module 334 may set the instability check indicator 370 to an active state when the instability check failed. The instability module 334 may set the instability check indicator 370 to an inactive state when the instability check passed.

As stated above, the offset value 346 is used in associating the imbalance corrections 242 with the cylinders, respectively. The re-synchronization triggering module 338 selectively triggers a re-synchronization event based on the variance check indicator 366 and/or the instability check indicator 370. More specifically, the re-synchronization triggering module 338 triggers a re-synchronization event when the variance check indicator 366 is in the active state and/or the instability check indicator 370 is in the active state. In other words, the re-synchronization triggering module 338 triggers a re-synchronization event when the variance check failed and/or the instability check failed. The re-synchronization triggering module 338 may trigger execution of a re-synchronization event using a re-synchronization indicator 374.

Performance of a re-synchronization event involves disabling use of the imbalance corrections 242, determining and a new set of imbalance values 342 and imbalance corrections 242, determining a new offset value 346, and re-associating the cylinders with the imbalance corrections 242, respectively. Use of the imbalance corrections 242 can be disabled, for example, by setting each of the imbalance corrections 242 to the predetermined no correction value. Use of the imbalance corrections 242 can then be re-enabled.

Figure 5A:
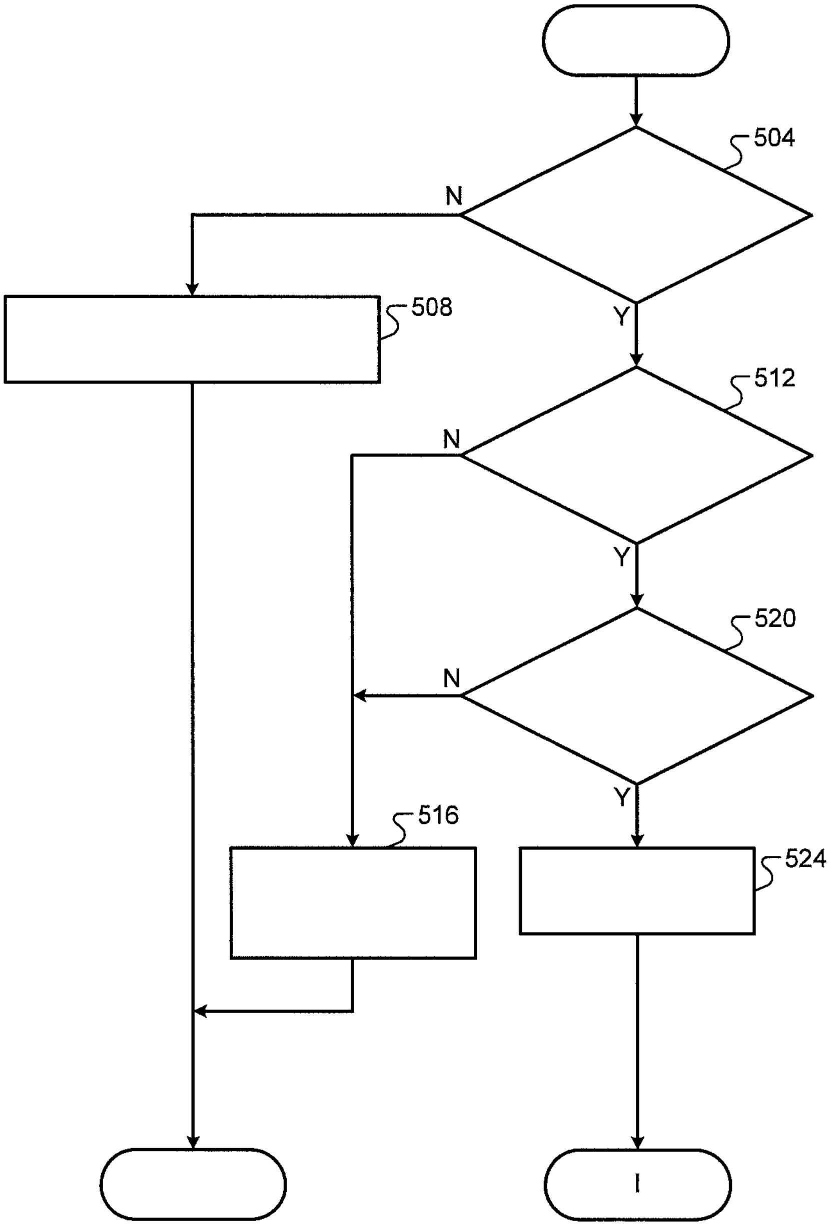
FIGS. 5A-5B are a flowchart depicting an example method of performing a variance check according to the present disclosure.
Figure 5B:
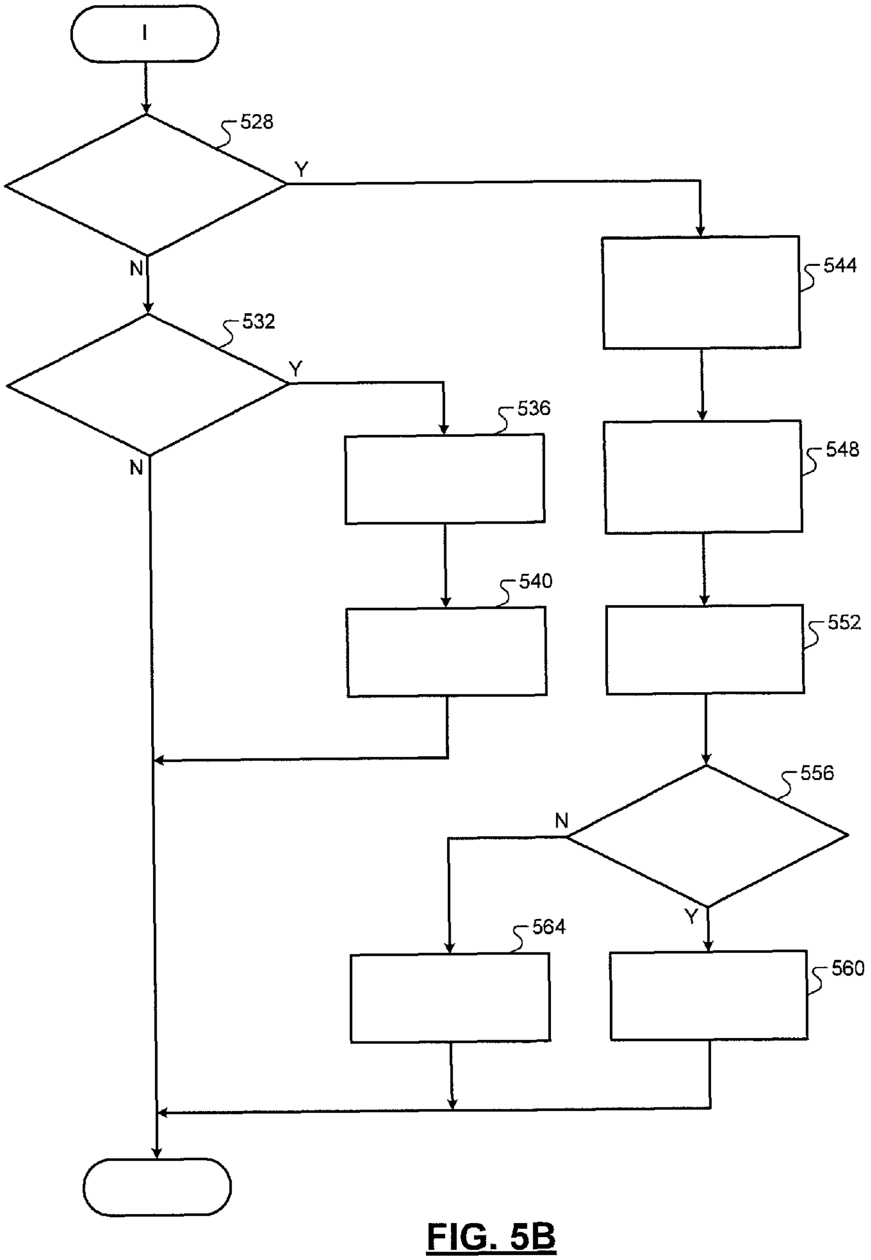

Referring now to FIGS. 5A-5B, a flowchart depicting an example method of performing a variance check is presented. Control may execute the method of FIGS. 5A-5B periodically, such as every engine cycle. Control may begin with 504 (FIG. 5A) where control determines whether use of the imbalance corrections 242 is enabled. If false, control may reset and disable an engine cycle counter at 508, and control may end. If true, control may continue with 512.

At 512, control may determine whether one or more of the imbalance corrections 242 are in the limited state and whether the imbalance corrections 242 are in SS. If none of the imbalance corrections 242 are in the limited state and/or the imbalance corrections 242 are not in SS, control may reset the engine cycle counter at 516, and control may end. If one or more of the imbalance corrections 242 are in the limited state and the imbalance corrections 242 are in SS, control may continue with 520.

Control may determine whether the engine 12 is in a normal state (i.e., not in a transient state) at 520. If true, control may increment the engine cycle counter (e.g., set engine cycle counter=engine cycle counter+1) at 524 and continue to 528 of FIG. 5B. If false, control may reset the engine cycle counter at 516, and control may end.

At 528 (FIG. 5B), control may determine whether the value of the engine cycle counter is greater than a third predetermined value multiplied by two. If false, control may proceed with 532. If true, control may transfer to 544, which is discussed further below. For example only, the third predetermined value may be approximately 100 (corresponding to 100 engine cycles) or another suitable value.

Control may determine whether the value of the engine cycle counter is greater than the third predetermined value at 532. If true, control may continue with 536. If false, control may end. At 536, control sets the first variance value equal to the filtered variance 354. Control then disables use of the imbalance corrections 242 at 540, and control may end. Control may, for example, set each of the imbalance corrections 242 to the predetermined no correction value at 540.

At 544 (when the value of the engine cycle counter is greater than the third predetermined value multiplied by two), control sets the second variance value equal to the filtered variance 354. Control determines the synchronization metric at 548 based on the first and second variance values at 548. For example only, control may set the synchronization metric equal to the second variance value divided by the first variance value.

Control may enable use of the imbalance corrections 242 at 552. At 556, control determines whether the synchronization metric value is greater than the first predetermined value. If true, control may indicate that the variance check passed at 560, and control may end. If false, control may indicate that the variance check failed at 564, and control may end.

Figure 6:
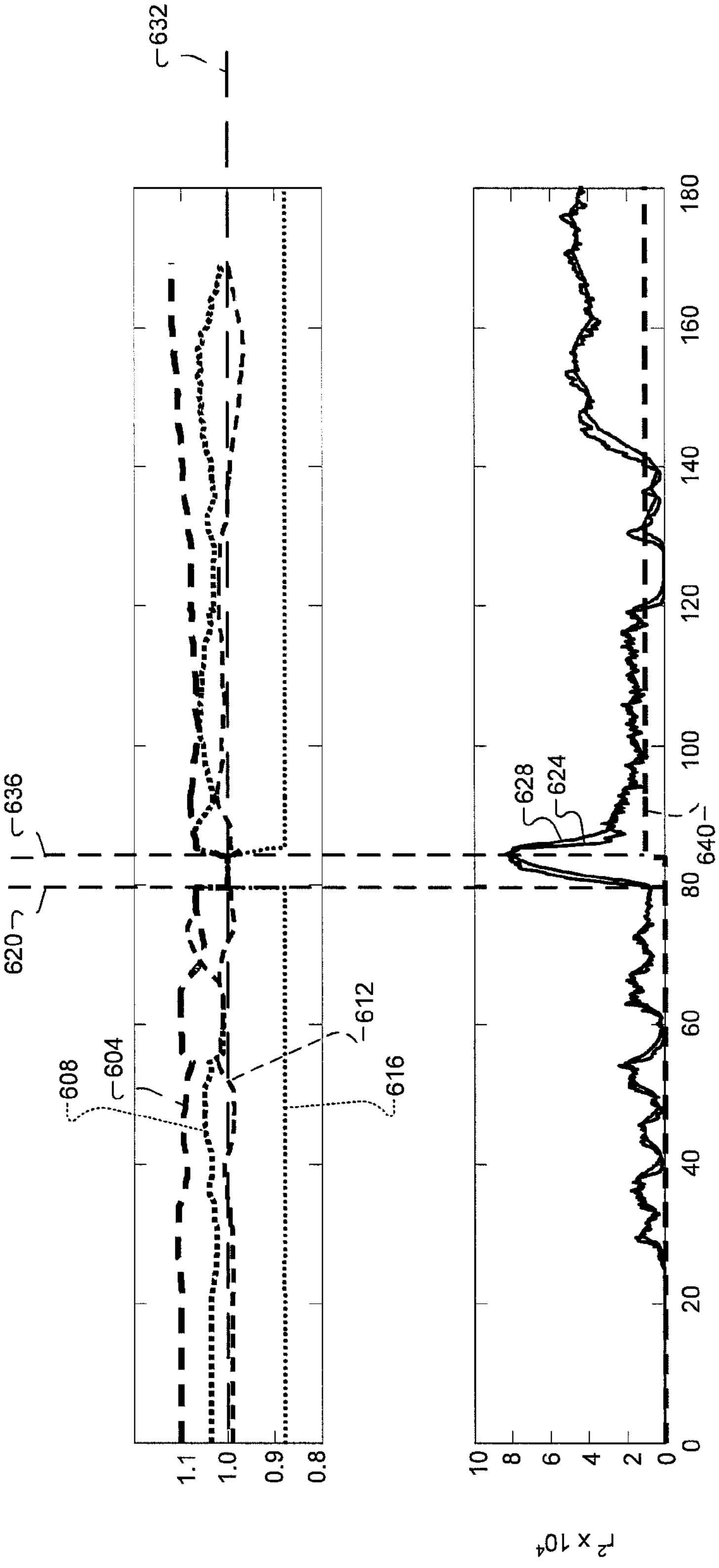
FIG. 6 is a graph of example data for a variance check.

Referring now to FIG. 6, a graph of example data for a variance check is presented. Example traces 604, 608, 612, and 616 track the imbalance corrections 242 for first, second, third, and fourth cylinders of an engine, respectively. The final EQR request 144 used for the fourth cylinder was made rich. Thus, the imbalance correction 242 for the fourth cylinder, as tracked by 616, is limited to the predetermined minimum value before time 620.

Approximately at or before time 620, the variance checking module 322 may set the first variance value equal to the filtered variance 354. Example trace 624 tracks the variance 350, and example trace 628 tracks the filtered variance 354. The imbalance corrections 242 for the first, second, third, and fourth cylinders are all set to the predetermined no correction value 632 at approximately time 620 to disable use of the imbalance corrections 242.

Later, such as when the second predetermined period has passed, at approximately time 636, the variance checking module 322 may set the second variance value equal to the filtered variance 354. The variance checking module 322 determines the synchronization metric based on the first and second variance values. Example trace 640 tracks the synchronization metric multiplied by 1000. Use of the imbalance corrections 242 can be enabled after time 636, and the variance checking module 322 determines whether the variance check passed or failed based on the synchronization metric.

Figure 7:
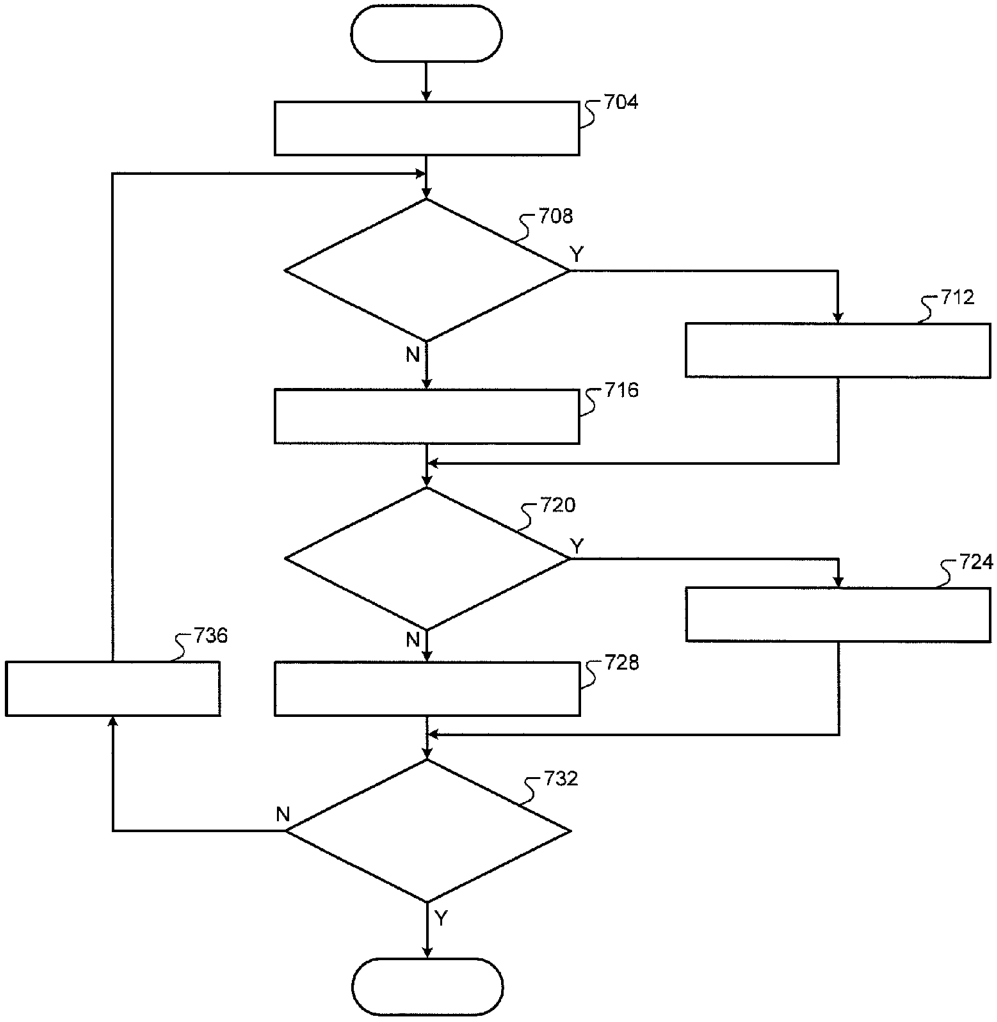
FIG. 7 is a flowchart depicting an example method of setting minimum and maximum limit indicators for cylinders, respectively, according to the present disclosure.

Referring now to FIG. 7, a flowchart depicting an example method of setting the maximum and minimum limit indicators used in performing an instability check is presented. Control may execute the method of FIG. 7 periodically, such as every engine cycle. Control may execute the method of FIG. 7 simultaneously with the method of FIGS. 5A-5B.

Control may begin with 704 where control may set a cylinder number equal to one. The cylinder number may correspond to a cylinder in the firing order. For example only, a cylinder number of one may correspond to the first cylinder in the firing order, a cylinder number of two may correspond to the second cylinder in the firing order, and so on.

At 708, control determines whether the one of the imbalance corrections 242 that is associated with the cylinder number (based on the offset value 346) is equal to the predetermined maximum value. If true, control sets the maximum limit indicator associated with the cylinder number to the active state at 712, and control continues with 720. If false, control sets the maximum limit indicator associated with the cylinder number to the inactive state at 716, and control continues with 720.

Control determines whether the one of the imbalance corrections 242 that is associated with the cylinder number is equal to the predetermined minimum value at 720. If true, control sets the minimum limit indicator associated with the cylinder number to the active state at 724, and control continues with 732. If false, control sets the minimum limit indicator associated with the cylinder to the inactive state at 728, and control continues with 732.

At 732, control may determine whether the cylinder number is equal to the total number of cylinders of the engine 12. If true, control may end. If false, control increments the cylinder number (e.g., set cylinder number=cylinder number+1) at 736, and control returns to 708.

Figure 8:
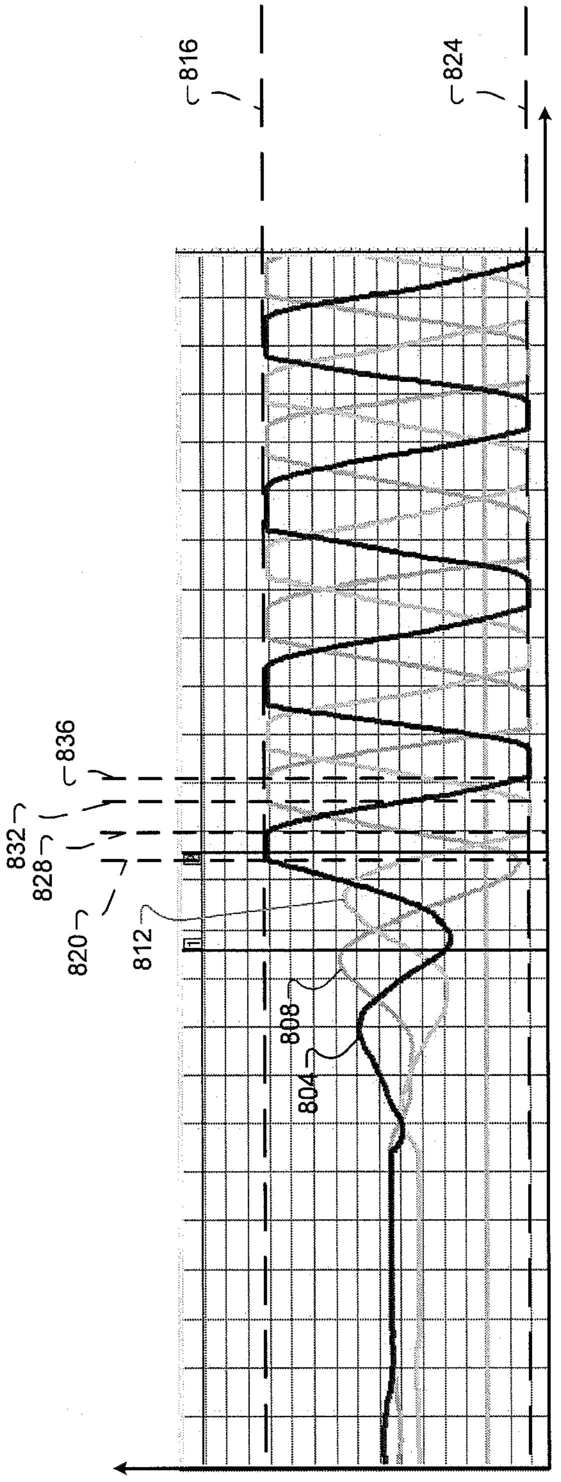
FIG. 8 is an example graph of imbalance (fueling) corrections for cylinders, respectively, as a function of time.

Referring now to FIG. 8, an example graph of imbalance corrections versus time is presented. Example traces 804, 808, and 812 track the imbalance corrections 242 for first, second, and third cylinders of an engine, respectively.

The imbalance correction 242 for the first cylinder, as tracked by 804, is approximately equal to the predetermined maximum value 816 at approximately time 820. Accordingly, the imbalance checking module 334 may set the maximum limit indicator for the first cylinder to the active state at approximately time 820. The imbalance correction 242 for the third cylinder, as tracked by 812, is approximately equal to the predetermined minimum value 824 at approximately time 828. Accordingly, the imbalance checking module 334 may set the minimum limit indicator for the third cylinder to the active state at approximately time 828.

The imbalance correction 242 for the second cylinder, as tracked by 808, is approximately equal to the predetermined maximum value 816 at approximately time 832. Accordingly, the imbalance checking module 334 may set the maximum limit indicator for the second cylinder to the active state at approximately time 832. The imbalance correction 242 for the first cylinder, as tracked by 804, is approximately equal to the predetermined minimum value 824 at approximately time 836. Accordingly, the imbalance checking module 334 may set the minimum limit indicator for the first cylinder to the active state at approximately time 836. Both the minimum and maximum indicators for the first cylinder are then in the active state, and the counter value can be incremented.

Figure 9:
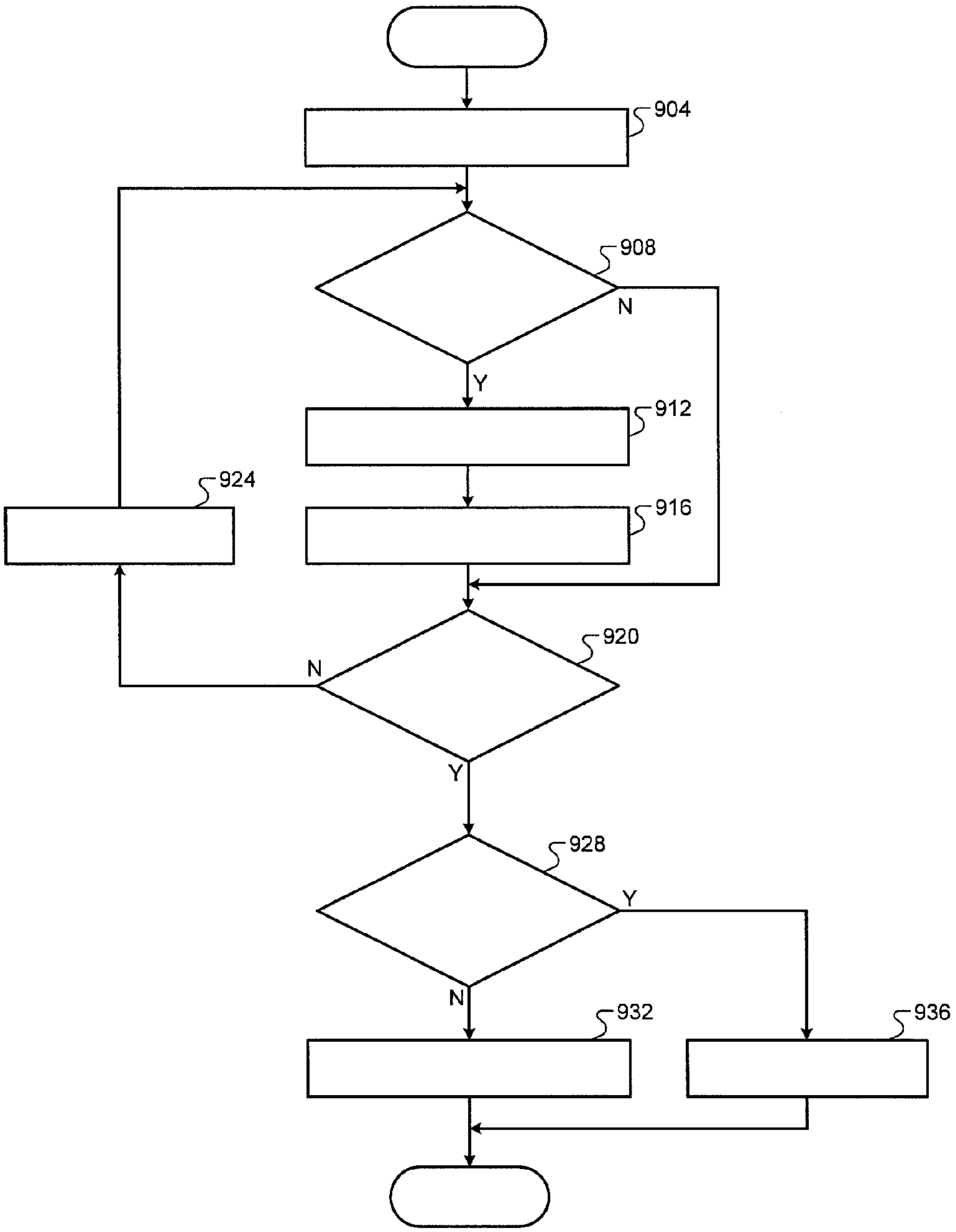
FIG. 9 is a flowchart depicting an example method of performing an instability check according to the present disclosure.

Referring now to FIG. 9, a flowchart depicting an example method of performing an instability check is presented. Control may execute the method of FIG. 9 periodically, such as every engine cycle. Control may execute the method of FIG. 9 simultaneously with the methods of FIGS. 5A-5B and FIG. 7.

Control may begin with 904 where control may set a second cylinder number equal to one. The second cylinder number may correspond to a cylinder in the firing order. For example only, a second cylinder number of one may correspond to the first cylinder in the firing order, a second cylinder number of two may correspond to the second cylinder in the firing order, and so on.

At 908, control may determine whether both the maximum limit indicator and the minimum limit indicator for the second cylinder number are in the active state. If true, control may continue with 912. If false, control may transfer to 920, which is discussed further below. At 912, control increments the counter value (e.g., set counter value=counter value+1). Control may reset the maximum and minimum limit indicators for all of the cylinders to the inactive state at 916.

At 920, control determines whether the second cylinder number is equal to the total number of cylinders of the engine 12. If false, control may increment the second cylinder number (e.g., set second cylinder number=second cylinder number+1) at 924, and control may return to 908. If true, control may continue with 928.

Control determines whether the counter value is greater than the third predetermined value at 928. If false, control indicates that the instability check passed at 932, and control may end. If true, control indicates that the instability check failed at 936, and control may end.

Figure 10:
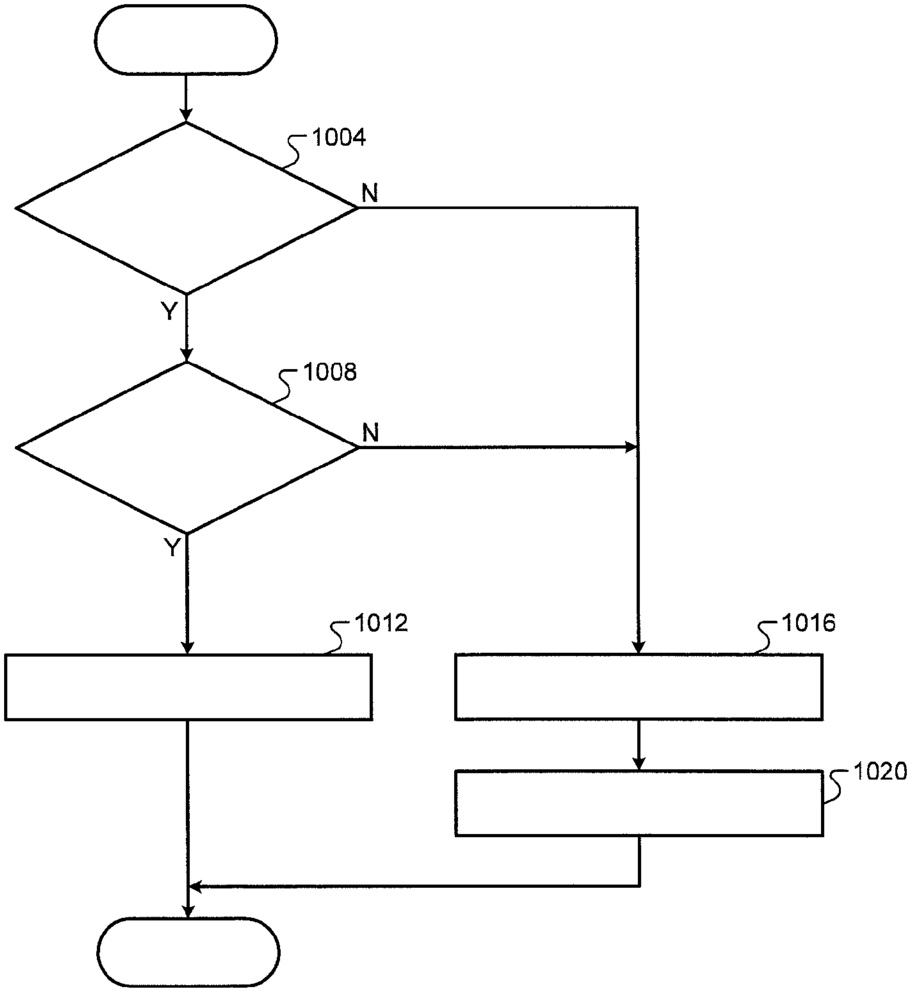
FIG. 10 is a flowchart depicting an example method of selectively triggering performance of a re-synchronization event according to the present disclosure.

Referring now to FIG. 10, a flowchart depicting an example method of selectively triggering performance of a re-synchronization event is presented. Control may execute the method of FIG. 10 periodically, such as every engine cycle. Control may execute the method of FIG. 10 simultaneously with the methods of FIGS. 5A-5B, FIG. 7, and FIG. 9.

Control may begin with 1004 where control determines whether the variance check passed. For example, control may determine whether the variance check indicator 366 is in the inactive state at 1004. If true, control may continue with 1008. If false, control may transfer to 1016, which is discussed further below. Control may determine whether the instability check passed at 1008. For example, control may determine whether the instability check indicator 370 is in the inactive state at 1008. If true, control may indicate that the imbalance corrections 242 are in sync with the cylinders, respectively, at 1012, and control may end. If false, control may continue with 1016.

At 1016, control may indicate that the imbalance corrections 242 and the cylinders are not in sync. Control may trigger execution of a re-synchronization event at 1020, and control may end.

What is claimed is:

1. A method for a vehicle, comprising:

determining imbalance values for cylinders of an engine based on samples of an exhaust gas oxygen signal generated using an exhaust gas oxygen (EGO) sensor;

determining an offset value that relates one of the imbalance values with one of the cylinders;

determining a fueling correction for the one of the cylinders based on the one of the imbalance values;

selectively adjusting fueling to the one of the cylinders based on the fueling correction;

re-synchronizing the imbalance values with the cylinders, respectively, in response to generation of a first indicator;

incrementing a counter value when the fueling correction is equal to one of a first predetermined value and a second predetermined value and was previously equal to the other one of the first and second predetermined values, wherein the first and second predetermined values are different; and selectively generating the first indicator when the counter value is greater than a third predetermined value, wherein the third predetermined value is an integer greater than zero.

2. The method of claim 1 further comprising:

relating other ones of cylinders of the engine with other ones of the imbalance values, respectively, based on the offset value and a firing order of the cylinders, determining other fueling corrections for the other cylinders based on the other ones of the imbalance values, respectively; and selectively adjusting fueling to the other cylinders based on the other fueling correction, respectively.

3. The method of claim 2 further comprising incrementing the counter value when one of the other fueling corrections is equal to one of the first and second predetermined values and was previously equal to the other one of the first and second predetermined values.

4. The method of claim 1 further comprising:

re-synchronizing the imbalance values with the cylinders, respectively, further in response to generation of a second indicator;

determining a variance of the imbalance values;

applying a filter to the variance to generate a filtered variance;

selectively setting a first variance equal to the filtered variance;

setting the fueling correction equal to a predetermined value for a predetermined period, wherein the fueling to the one of the cylinders is unadjusted when the fueling correction is equal to the predetermined value;

selectively setting a second variance equal to the filtered variance in response to the end of the predetermined period; and selectively generating the second indicator based on the first and second variances.

5. The method of claim 4 further comprising determining a synchronization metric based on the first and second variances, wherein the selectively generating the second indicator comprises generating the second indicator based on the synchronization metric.

6. The method of claim 5 further comprising setting the synchronization metric equal to the second variance divided by the first variance.

7. The method of claim 6 wherein the selectively generating the second indicator comprises generating the second indicator when the synchronization metric is less than a second predetermined value.

8. The method of claim 7 wherein the second predetermined value is approximately one.

9. The method of claim 4 wherein the selectively generating the second indicator comprises generating the second indicator when the second variance is not greater than the first variance by at least a predetermined amount.

10. The method of claim 9 wherein the predetermined amount is greater than zero.

11. A method for a vehicle, comprising:

determining imbalance values for cylinders of an engine based on samples of an exhaust gas oxygen signal generated using an exhaust gas oxygen (EGO) sensor;

determining an offset value that relates one of the imbalance values with one of the cylinders;

determining a fueling correction for the one of the cylinders based on the one of the imbalance values;

selectively adjusting fueling to the one of the cylinders based on the fueling correction;

re-synchronizing the imbalance values with the cylinders, respectively, in response to generation of an indicator;

determining a variance of the imbalance values;

applying a filter to the variance to generate a filtered variance;

selectively setting a first variance equal to the filtered variance;

setting the fueling correction equal to a predetermined value for a predetermined period, wherein the fueling to the one of the cylinders is unadjusted when the fueling correction is equal to the predetermined value;

selectively setting a second variance equal to the filtered variance in response to the end of the predetermined period;

setting a synchronization metric equal to the second variance divided by the first variance; and selectively generating the indicator based on the synchronization metric.

12. The method of claim 11 wherein the selectively generating the indicator comprises generating the indicator when the synchronization metric is less than a second predetermined value.

13. The method of claim 12 wherein the second predetermined value is approximately one.

14. A system for a vehicle, comprising:

an imbalance module that determines imbalance values for cylinders of an engine based on samples of an exhaust gas oxygen signal generated using an exhaust gas oxygen (EGO) sensor;

an offset module that determines an offset value that relates one of the imbalance values with one of the cylinders;

a correction module that determines a fueling correction for the one of the cylinders based on the one of the imbalance values, wherein fueling to the one of the cylinders is selectively adjusted based on the fueling correction;

an instability module that increments a counter value when the fueling correction is equal to one of a first predetermined value and a second predetermined value and was previously equal to the other one of the first and second predetermined values and that selectively generates an indicator when the counter value is greater than a third predetermined value, wherein the first and second predetermined values are different, and wherein the third predetermined value is an integer greater than zero; and a re-synchronization module that re-synchronizes the imbalance values with the cylinders, respectively, in response to generation of the indicator.

15. The system of claim 14 wherein the correction module relates other ones of cylinders of the engine with other ones of the imbalance values, respectively, based on the offset value and a firing order of the cylinders, wherein the correction module determines other fueling corrections for the other cylinders based on the other ones of the imbalance values, respectively; and wherein fueling to the other cylinders is selectively adjusted based on the other fueling correction, respectively.

16. The system of claim 15 wherein the instability module increments the counter value when one of the other fueling corrections is equal to one of the first and second predetermined values and was previously equal to the other one of the first and second predetermined values.

17. The system of claim 14 further comprising:

a variance determination module that determines a variance of the imbalance values;

a filtering module that applies a filter to the variance to generate a filtered variance; and a variance checking module that selectively generates a second indicator, wherein:

the variance checking module selectively sets a first variance equal to the filtered variance;

the correction module sets the fueling correction equal to a predetermined value for a predetermined period, wherein the fueling to the one of the cylinders is unadjusted when the fueling correction is equal to the predetermined value;

the variance checking module selectively sets a second variance equal to the filtered variance in response to the end of the predetermined period;

the variance checking module selectively generates the second indicator based on the first and second variances; and the re-synchronization module re-synchronizes the imbalance values with the cylinders, respectively, further in response to generation of the second indicator.

18. The system of claim 17 wherein the variance checking module:

determines a synchronization metric based on the first and second variances; and selectively generates the second indicator based on the synchronization metric.

19. The system of claim 18 wherein the variance checking module sets the synchronization metric equal to the second variance divided by the first variance.

20. The system of claim 19 wherein the variance checking module generates the second indicator when the synchronization metric is less than a second predetermined value.

21. The system of claim 20 wherein the second predetermined value is approximately one.

22. The system of claim 17 wherein the variance checking module generates the second indicator when the second variance is not greater than the first variance by at least a predetermined amount.

23. The system of claim 22 wherein the predetermined amount is greater than zero.

* * * * *